(12) United States Patent
Sodagar

(10) Patent No.: US 12,417,586 B2
(45) Date of Patent: *Sep. 16, 2025

(54) METHOD FOR STREAMING DYNAMIC 5G AR/MR EXPERIENCE TO 5G DEVICES WITH UPDATABLE SCENES

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,459

(22) Filed: Jul. 12, 2024

(65) Prior Publication Data

US 2024/0371103 A1 Nov. 7, 2024

Related U.S. Application Data

(63) Continuation of application No. 17/705,905, filed on Mar. 28, 2022, now Pat. No. 12,045,940.
(Continued)

(51) Int. Cl.
  *G06T 19/00* (2011.01)
  *G06V 20/00* (2022.01)
  (Continued)

(52) U.S. Cl.
  CPC .......... *G06T 19/003* (2013.01); *G06T 19/006* (2013.01); *G06V 20/35* (2022.01);
  (Continued)

(58) Field of Classification Search
  CPC . G06T 19/003; G06T 19/006; G06T 2210/08; G06V 20/35; H04L 65/60;
  (Continued)

(56) References Cited

U.S. PATENT DOCUMENTS 6,714,201 B1    3/2004  Grinstein et al.
2018/0285129 A1  10/2018 Mangino
(Continued)

FOREIGN PATENT DOCUMENTS

CN   107909643 A    4/2018
JP   2019-535191 A  12/2019
WO   2018/064283 A1 4/2018

OTHER PUBLICATIONS

Communication dated Aug. 13, 2024, issued in Japanese Application No. 2023-552350.
(Continued)

*Primary Examiner* — Nicholas R Taylor
*Assistant Examiner* — Angela Widhalm De Rodriguez
(74) *Attorney, Agent, or Firm* — Sughrue Mion, PLLC

(57) ABSTRACT

A method is provided. The method includes selecting media content including a full scene description, selecting a 5$^{th}$ generation (5G) media streaming downlink (5GMSd) application server (AS) to stream the media content based on the full scene description, deriving a simplified scene description based on the full scene description, and creating an augmented reality (AR)/mixed reality (MR) session based on the simplified scene description.

20 Claims, 10 Drawing Sheets

Related U.S. Application Data

(60) Provisional application No. 63/275,358, filed on Nov. 3, 2021.

(51) Int. Cl.
  *H04L 65/60* (2022.01)
  *H04L 65/75* (2022.01)
  *H04L 67/00* (2022.01)
  *H04L 67/131* (2022.01)
  *H04L 67/14* (2022.01)
  *H04L 67/2866* (2022.01)
  *H04L 67/50* (2022.01)
  *H04W 4/06* (2009.01)

(52) U.S. Cl.
  CPC .............. *H04L 65/60* (2013.01); *H04L 65/75* (2022.05); *H04L 67/131* (2022.05); *H04L 67/14* (2013.01); *H04L 67/2866* (2013.01); *H04L 67/34* (2013.01); *H04L 67/50* (2022.05); *H04W 4/06* (2013.01)

(58) Field of Classification Search
  CPC ....... H04L 65/75; H04L 67/131; H04L 67/14; H04L 67/2866; H04L 67/34; H04L 67/50; H04L 65/1059; H04L 65/1063; H04L 67/02; H04L 65/612; H04L 65/613; H04L 65/80; H04L 67/2869; H04L 65/1069; H04W 4/06; H04W 48/17
  See application file for complete search history.

(56) References Cited

U.S. PATENT DOCUMENTS

| | | | |
|---|---|---|---|
| 2019/0043209 A1 | 2/2019 | Nishimura et al. | |
| 2019/0114830 A1* | 4/2019 | Bouazizi ................ | G06F 3/013 |
| 2019/0213784 A1 | 7/2019 | Schmalstieg et al. | |
| 2021/0044636 A1 | 2/2021 | Miller | |
| 2021/0051522 A1* | 2/2021 | Zhou .................... | H04W 24/08 |
| 2021/0105451 A1 | 4/2021 | Oyman | |
| 2021/0203756 A1* | 7/2021 | Yerli .................. | H04L 41/0806 |
| 2021/0274235 A1 | 9/2021 | Anderegg et al. | |
| 2021/0275915 A1 | 9/2021 | Fersch et al. | |
| 2021/0304503 A1* | 9/2021 | Bastov ................ | G06T 19/006 |
| 2021/0320955 A1* | 10/2021 | Kolan ................ | H04L 65/1101 |
| 2023/0011858 A1 | 1/2023 | Li et al. | |

OTHER PUBLICATIONS

International Search Report issued Jul. 27, 2022 in International Application No. PCT/US2022/022269.

Written Opinion of the International Searching Authority issued Jul. 27, 2022 in International Application No. PCT/US2022/022269.

"3rd Generation Partnership Project; Technical Specification Group SA; Support of 5G Glass-type Augmented Reality / Mixed Reality (AR/MR) devices; (Release 17)", 3GPP TR 26.998, Oct. 2021, V1.0.3, 92 pages.

"3rd Generation Partnership Project; Technical Specification Group Services and System Aspects; 5G Media Streaming (5GMS); General description and architecture (Release 16)", 3GPP TS 26.501, Jun. 2021, 79 pages, V16.8.0.

Samsung Electronics Co., Ltd. "[FS_5GStar] Updates to 6.3.4 procedures and call flows for interactive immersive services" 3GPP TSG SA WG4 Video SWG Telco post 115-e, Oct. 26, 2021, S4aV210814, (6 pages).

Tencent "[FS_5GStar] Edgar-based media streaming update", SA4, 3GPPSA4#115-e, Aug. 18-27, 2021, S4-211122, Version. 0.9.0, (10 pages).

Tencent Cloud: "[FS_5GStar] Updates to 6.2.4. procedures and call flows for Star and Edgar based media streaming", 3GPP TSG 3GPPSA4#116-e, Nov. 10-19, 2021, S4-211407 (6 pages).

Extended European Search Report dated Feb. 4, 2025 in Application No. 22890569.1.

* cited by examiner

702 Select media content including a full scene description.

704 Select a 5GMSd AS to stream the media content based on the full scene description.

706 Derive a simplified scene description based on the full scene description.

708 Create an AR/MR session based on the simplified scene description.

METHOD FOR STREAMING DYNAMIC 5G AR/MR EXPERIENCE TO 5G DEVICES WITH UPDATABLE SCENES

CROSS-REFERENCE TO RELATED APPLICATION

This application is a Continuation of U.S. application Ser. No. 17/705,905 filed Mar. 28, 2022, which claims priority from U.S. Provisional Application No. 63/275,358, filed on Nov. 3, 2021, in the United States Patent and Trademark Office, the disclosure of which is incorporated herein by reference in its entirety.

FIELD

The disclosure generally relates to $5^{th}$ generation (5G) augmented reality (AR)/mixed reality (MR), and, in particular, to a method and apparatus for providing AR/MR content to 5G devices in which the scenes are dynamically updated.

BACKGROUND

The 3rd Generation Partnership Project (3GPP) TS26.501 defines the media streaming architecture for $5^{th}$ generation (5G) networks. The 3GPP started a technical report on supporting augmented reality (AR)/mixed reality (MR) applications. 3GPP TR 26.998 defines the support for glass-type AR/MR devices in 5G networks. Two device classes are considered: devices that are fully capable of decoding and playing complex AR/MR content (i.e., stand-alone AR (STAR)), and devices that have smaller computational resources and/or smaller physical size (i.e., a smaller battery), and are only capable of running such applications if the larger portion of the computation is performed on 5G edge servers, networks, or clouds rather than on the device (edge dependent AR (EDGAR). However, the call flow for the EDGAR device does not support scene updates.

SUMMARY

In accordance with an aspect of the disclosure, a method may include selecting media content including a full scene description, selecting a $5^{th}$ generation (5G) media streaming downlink (5GMSd) application server (AS) to stream the media content based on the full scene description, deriving a simplified scene description based on the full scene description, and creating an augmented reality (AR)/mixed reality (MR) session based on the simplified scene description.

In accordance with an aspect of the disclosure, a device may include at least one memory configured to store program code and at least one processor configured to read the program code and operate as instructed by the program code, the program code including first selecting code configured to cause the at least one processor to select media content including a full scene description, second selecting code configured to cause the at least one processor to select a 5GMSd AS to stream the media content based on the full scene description, first deriving code configured to cause the at least one processor to derive a simplified scene description based on the full scene description, and first creating code configured to cause the at least one processor to create an AR/MR session based on the simplified scene description.

In accordance with an aspect of the disclosure, a non-transitory computer-readable medium may store instructions, the instructions including one or more instructions that, when executed by one or more processors of a device, cause the one or more processors to select media content including a full scene description, select a 5GMSd AS to stream the media content based on the full scene description, derive a simplified scene description based on the full scene description, and create an AR/MR session based on the simplified scene description.

BRIEF DESCRIPTION OF THE DRAWINGS

Further features, the nature, and various advantages of the disclosed subject matter will be more apparent from the following detailed description and the accompanying drawings in which:

FIG. 7 is a flowchart of a method for EDGAR-based 5G downlink streaming, according to embodiments.

DETAILED DESCRIPTION

Figure 1:
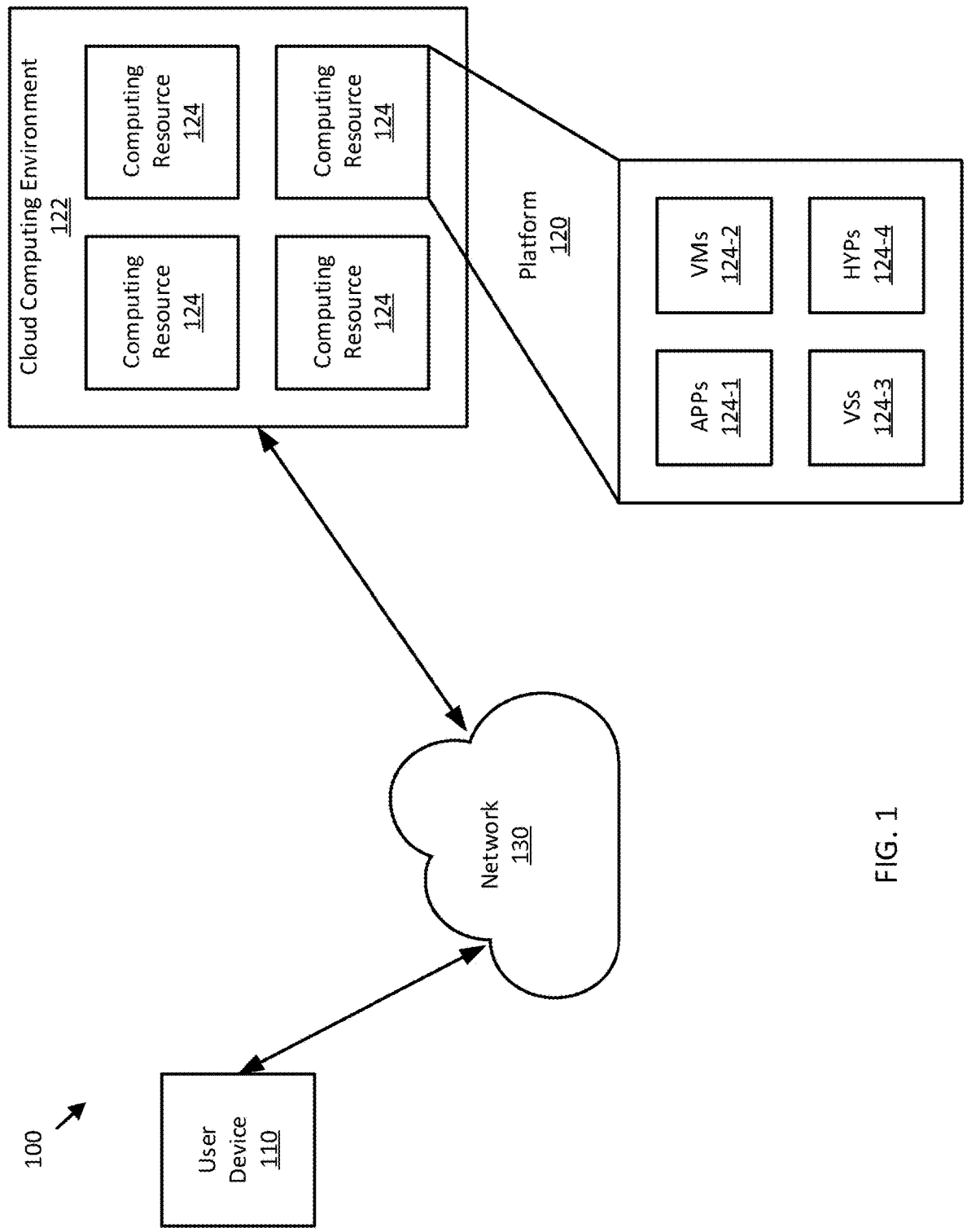
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
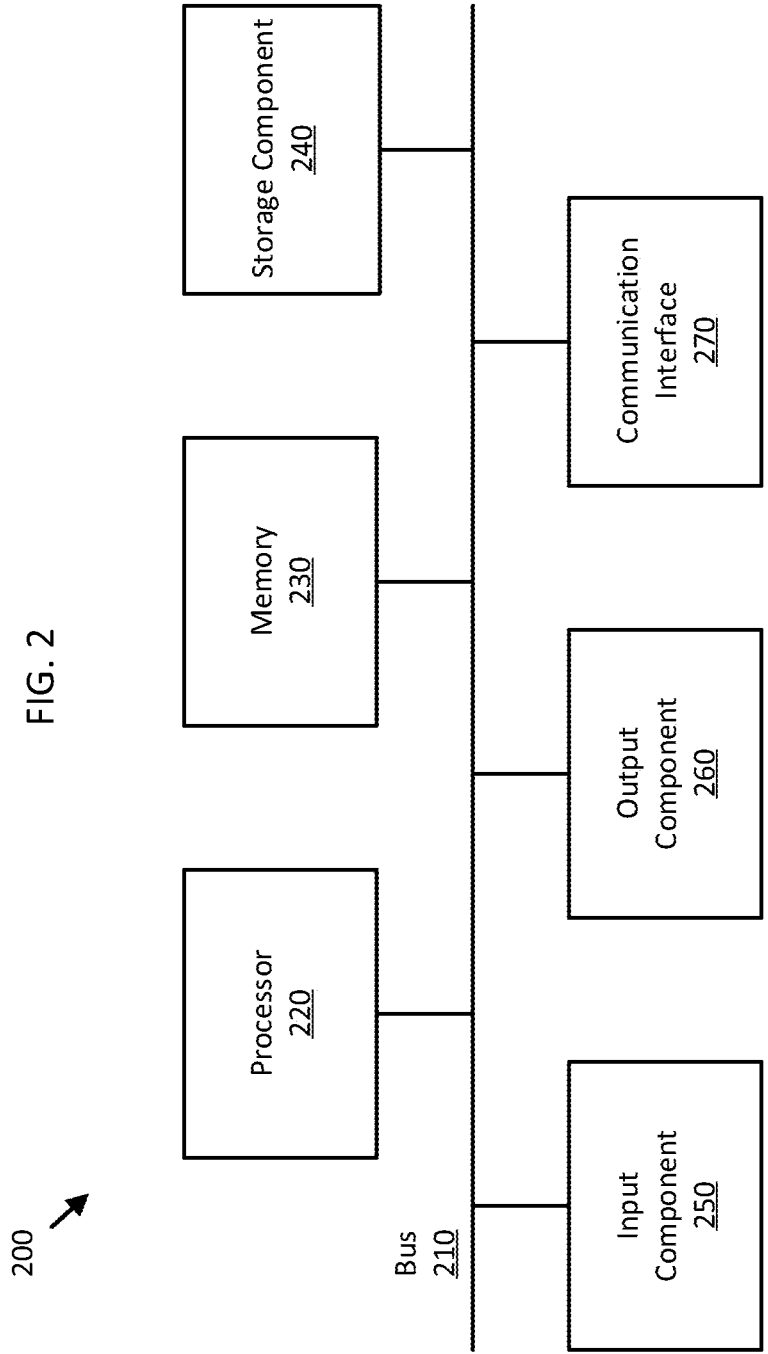
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/ Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/ NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
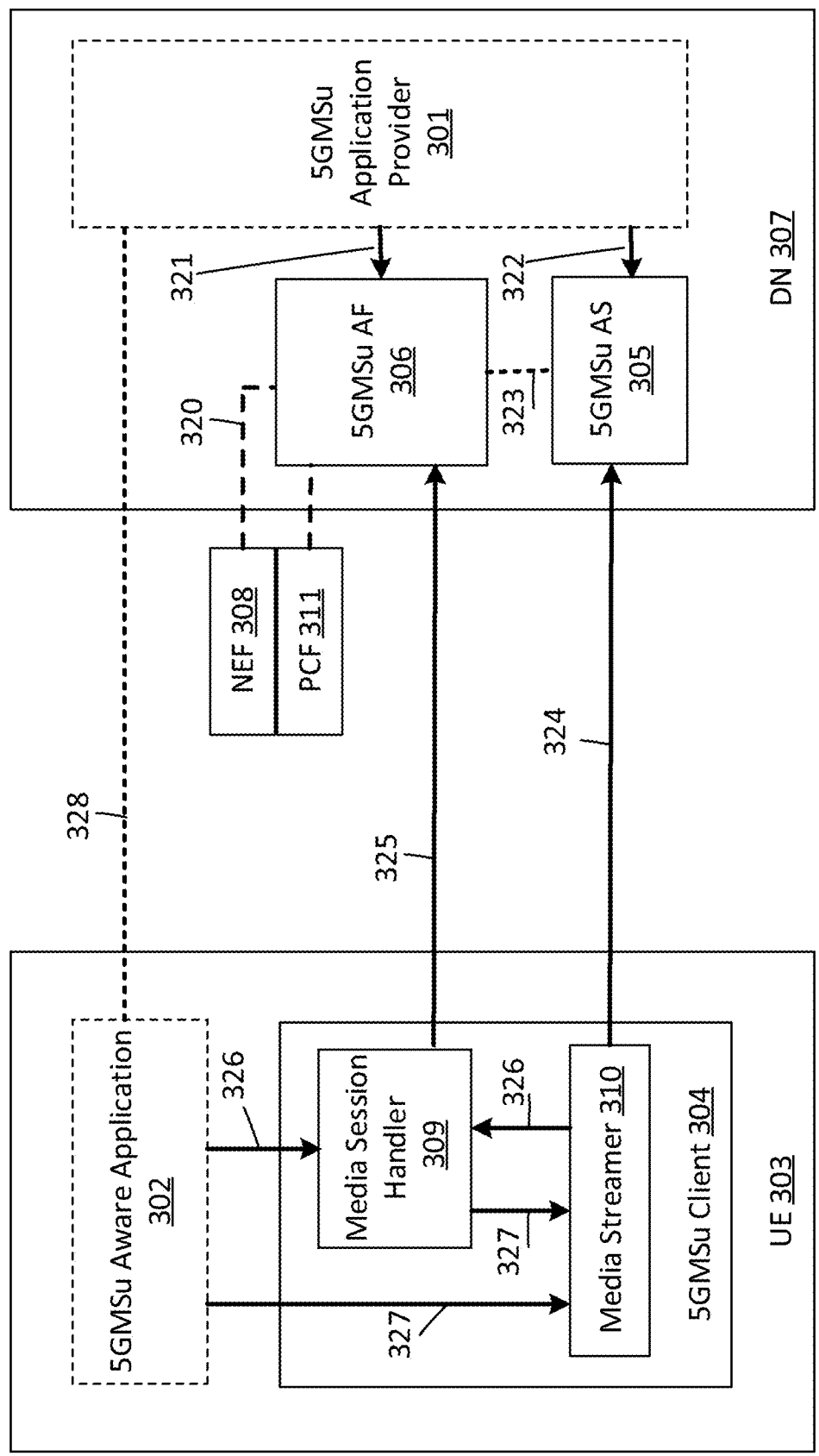
FIG. 3 is a diagram of a media architecture for media uplink streaming, according to embodiments.

FIG. 3 is a diagram of a media architecture 300 for media uplink streaming according to embodiments. A 5GMSu Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu AS may be an AS dedicated to 5G Media Uplink Streaming. 5GMSu Client 304 may be a UE 303 internal function dedicated to 5G Media Uplink Streaming.

5GMSu AF 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the NEF 308 using link 320.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 304 by implementing external application or content service provider specific logic and enabling the establishment of a media session. 5GMSu AS 305 may host 5G media functions and may be implemented as a content delivery network (CDN), for example. 5GMSu Application Provider 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different PCF 311 treatment or interact with other network functions.

Media architecture 300 may include a number of different interfaces. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 323 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302. The UE 303 may also be implemented in a self-contained manner such that interfaces M6u 326 and M7u 327 are not exposed.

Figure 4:
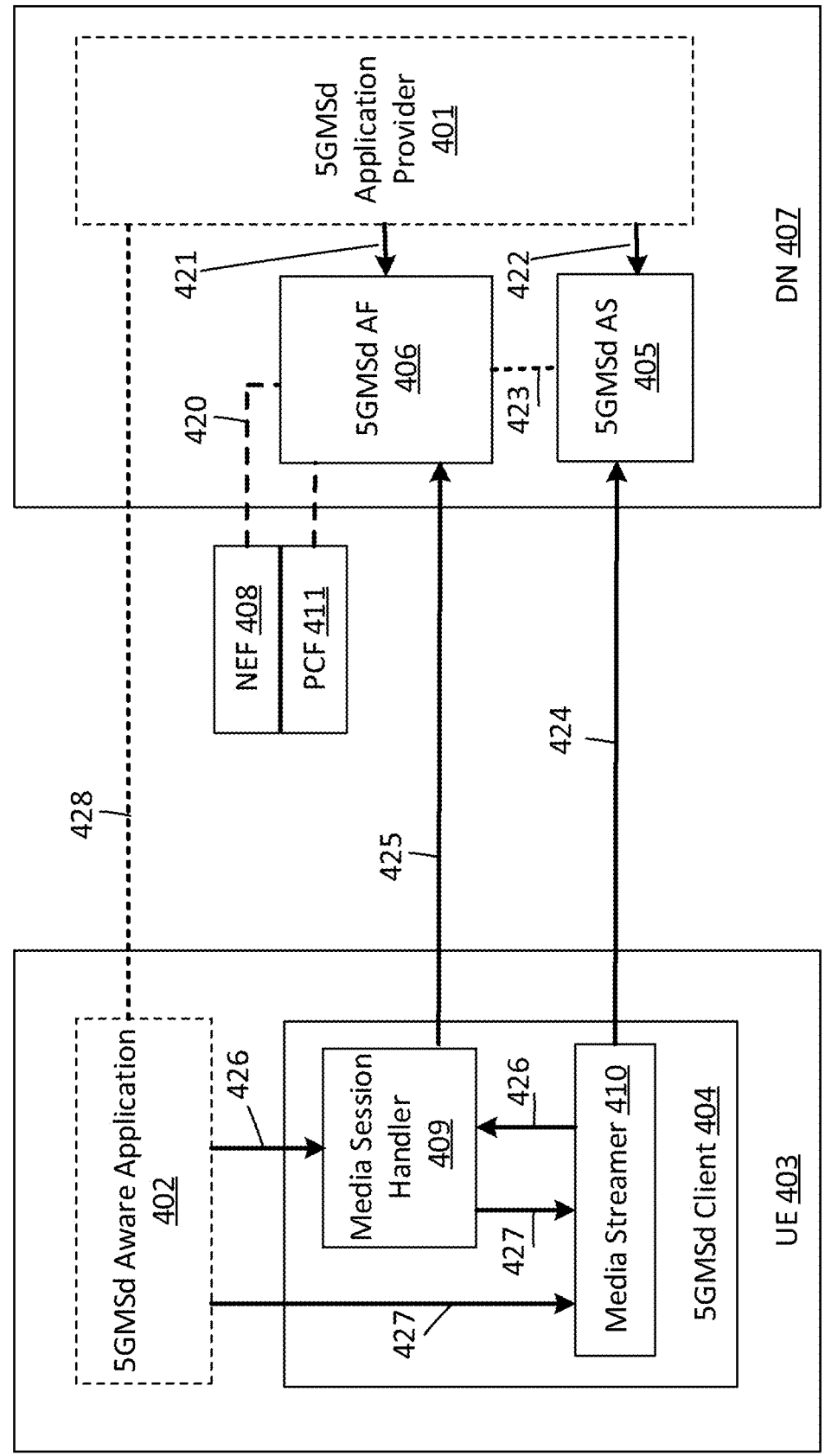
FIG. 4 is a diagram of a media architecture for media downlink streaming, according to embodiments.

FIG. 4 is a diagram of a media architecture 400 for media downlink streaming, according to embodiments. A 5GMSd Application Provider 401 may use 5GMSd for downlink streaming services. 5GMSd Application provider 401 may provide a 5GMSd Aware Application 402 on the UE 403 to make use of 5GMSd Client 404 and network functions using interfaces and APIs defined in 5GMSd. 5GMSd AS may be an AS dedicated to 5G Media Downlink Streaming. 5GMSd Client 404 may be a UE 403 internal function dedicated to 5G Media Downlink Streaming.

5GMSd AF 406 and 5GMSd AS 405 may be DN 407 functions. Functions in trusted DNs may be trusted by the operator's network. Therefore, AFs in trusted DNs may directly communicate with all 5G Core functions. Functions in external DNs may only communicate with 5G Core functions via the NEF 408 using link 420.

The media architecture 400 may connect UE 403 internal functions and related network functions for 5G Media Downlink Streaming. Accordingly, media architecture 400 may include a number of functions. For example, 5GMSd Client 404 on UE 403 may be a receiver of 5GMSd service that may be accessed through interfaces/APIs. 5GMSd Client 404 may include two sub-functions, media session handler 409 and media Player 410. Media session handler 409 may communicate with the 5GMSd AF 406 in order to establish, control and support the delivery of a media session. The Media Session Handler 409 may expose APIs that can be used by the 5GMSd Aware Application 402. Media Player 410 may communicate with 5GMSd AS 405 in order to stream the media content and provide a service to the 5GMSd Aware Application 402 for media playback, and the Media Session Handler 409 for media session control. 5GMSd Aware Application 402 may control 5GMSd Client 404 by implementing external application or content service provider specific logic and enabling the establishment of a media session. 5GMSd AS 405 may host 5G media functions. 5GMSd Application Provide 401 may be an external application or content specific media functionality, e.g., media creation, encoding, and formatting that uses 5GMSd to stream media to 5GMSd Aware Application 402. 5GMSd AF 406 may provide various control functions to the Media Session Handler 409 on the UE 403 and/or to 5GMSd Application Provider 401. 5GMSd AF 406 may relay or initiate a request for different PCF 411 treatment or interact with other network functions.

Media architecture 400 may include a number of different interfaces. For example, link 421 may relate to M1d, which may be a 5GMSd Provisioning API exposed by 5GMSd AF 406 to provision usage of media architecture 400 and to obtain feedback. Link 422 may relate to M2d, which may be a 5GMSd Ingest API exposed by 5GMSd AS 405 and used when 5GMSd AS 405 in trusted DN, such as DN 407, is selected to receive content for streaming service. Link 423 may relate to M3d, which may be an internal API used to exchange information for content hosting on 5GMSd AS 405 within a trusted DN such as DN 407. Link 424 may relate to M4d, which may be a Media Downlink Streaming API exposed by 5GMSd AS 423 to Media Player 410 to stream media content. Link 425 may relate to M5d, which may be a Media Session Handling API exposed by 5GMSd AF 405 to Media Session Handler for media session handling, control and assistance that also include appropriate security mechanisms e.g. authorization and authentication. Link 426 may relate to M6d, which may be a UE 403 Media Session Handling API exposed by Media Session Handler 409 to 5GMSd Aware Application 402 to make use of 5GMSd functions. Link 427 may relate to M7d, which may be a UE Media Player API exposed by Media Player 410 to 5GMSd Aware Application 402 and Media Session Handler 409 to make use of Media Player 410. Link 428 may relate to M8d, which may be an Application API which is used for information exchange between 5GMSd Aware Application 402 and 5GMSd Application Provider 401, for example to provide service access information to the 5GMSd Aware Application 402.

Figure 5A:
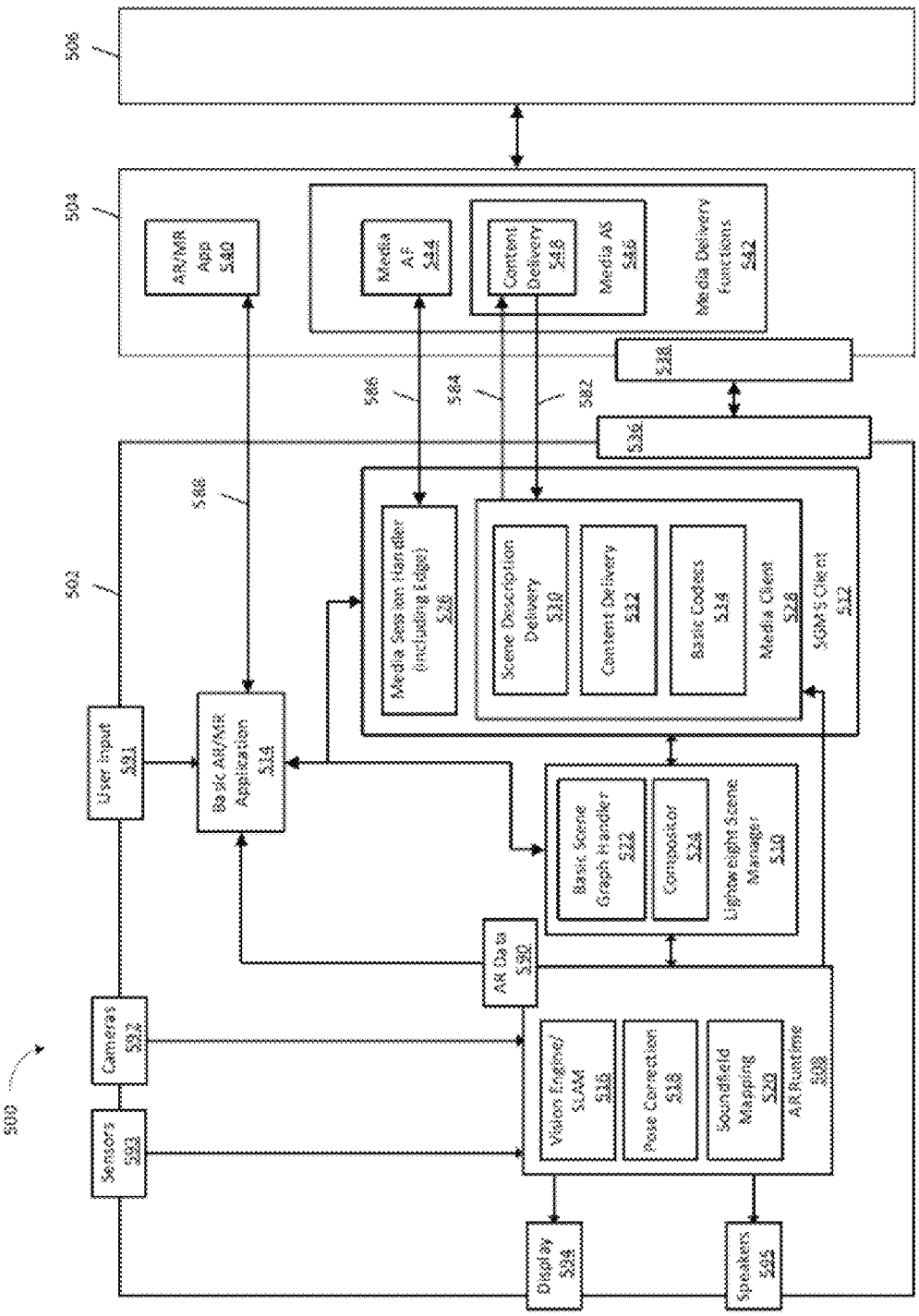
FIGS. 5A and 5B are diagrams of an edge dependent augmented reality (AR) (EDGAR) $5^{th}$ Generation media streaming downlink (5GMSd) download architecture, according to embodiments.
Figure 5B:
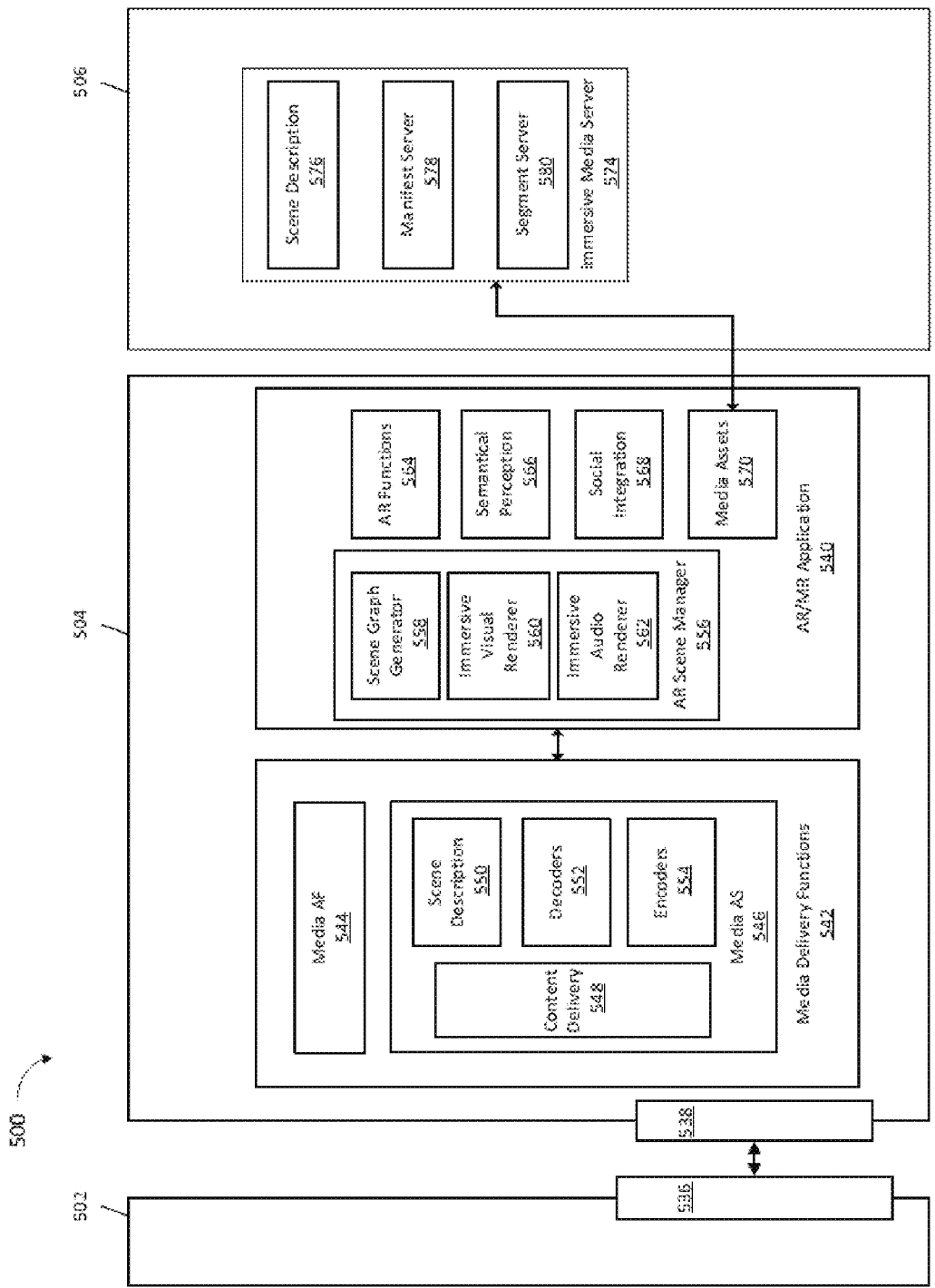

FIGS. 5A and 5B are diagrams of an edge dependent augmented reality (AR) (EDGAR) 5GMSd download architecture 500, according to embodiments. The AR EDGAR 5GMSd architecture 500 may be applied to mixed reality (MR) as well. The architecture 500 includes a 5G EDGAR UE 502, a cloud/edge server 504 and an AR/MR application provider 506. The 5G EDGAR UE 502 includes an AR runtime 508, a lightweight scene manager 510, a 5GMS client 512 and a basic AR/MR application 514. The AR runtime 508 includes a vision engine/simultaneous localization and mapping (SLAM) 516, a pose correction module 518, and a soundfield mapping module 520. The lightweight scene manager 510 includes a basic scene graph handler (SGH) 522 and a compositor 524. The 5GMS client 512 includes a media session handler (including an edge session) 526 and a media client 528. The media client 528 includes a scene description delivery module 530, a content delivery module 532 and basic codecs 534. The 5G EDGAR UE 502 includes a 5G lightweight system (Uu) 536 that is in communication with a 5G system (gNb) 538 of the cloud/edge server 504.

The cloud/edge server 504 includes an AR/MR application 540 and media delivery functions 542. The media delivery functions 542 include a media AF 544 and a media AS 546. The media AS 546 includes a content delivery function 548, a scene description function (SDF) 550, decoders 552 and encoders 554. The AR/MR application 540 includes an AR scene manager 556, AR functions 564, a semantical perception module 566, a social integration module 568, and a media assets database 570. The AR scene manager 556 includes a scene graph generator 558, an immersive visual renderer 560 and an immersive audio renderer 562.

The AR/MR application provider 506 includes an immersive media server 574. The immersive media server 574 includes a scene description module 576, a manifest server 578, and a segment server 580.

The media client 528 transmits to the content delivery module 548 by an M4 interface 582 (e.g., transmitting pose and interactions). The content delivery module 548 transmits to the media client 528 by an M4 interface 584 (e.g., transmitting pre-rendered media). The media session handler 526 is in communication with the media AF 544 by an M5d interface 586. The basic AR/MR application 514 is in communication with the AR/MR application 540 by an M8 interface 588. The basic AR/MR application 514 may receive a user input 591 and AR data 590 from the AR runtime 508. The AR runtime 508 may receive data from cameras 592 and sensors 593, and may output data to a display 594 and to speakers 595.

Embodiments of the disclosure provide a call flow that includes two loops: streaming scene and scene updates as an outer loop, and streaming media objects of each scene as an inner loop.

Figure 6A:
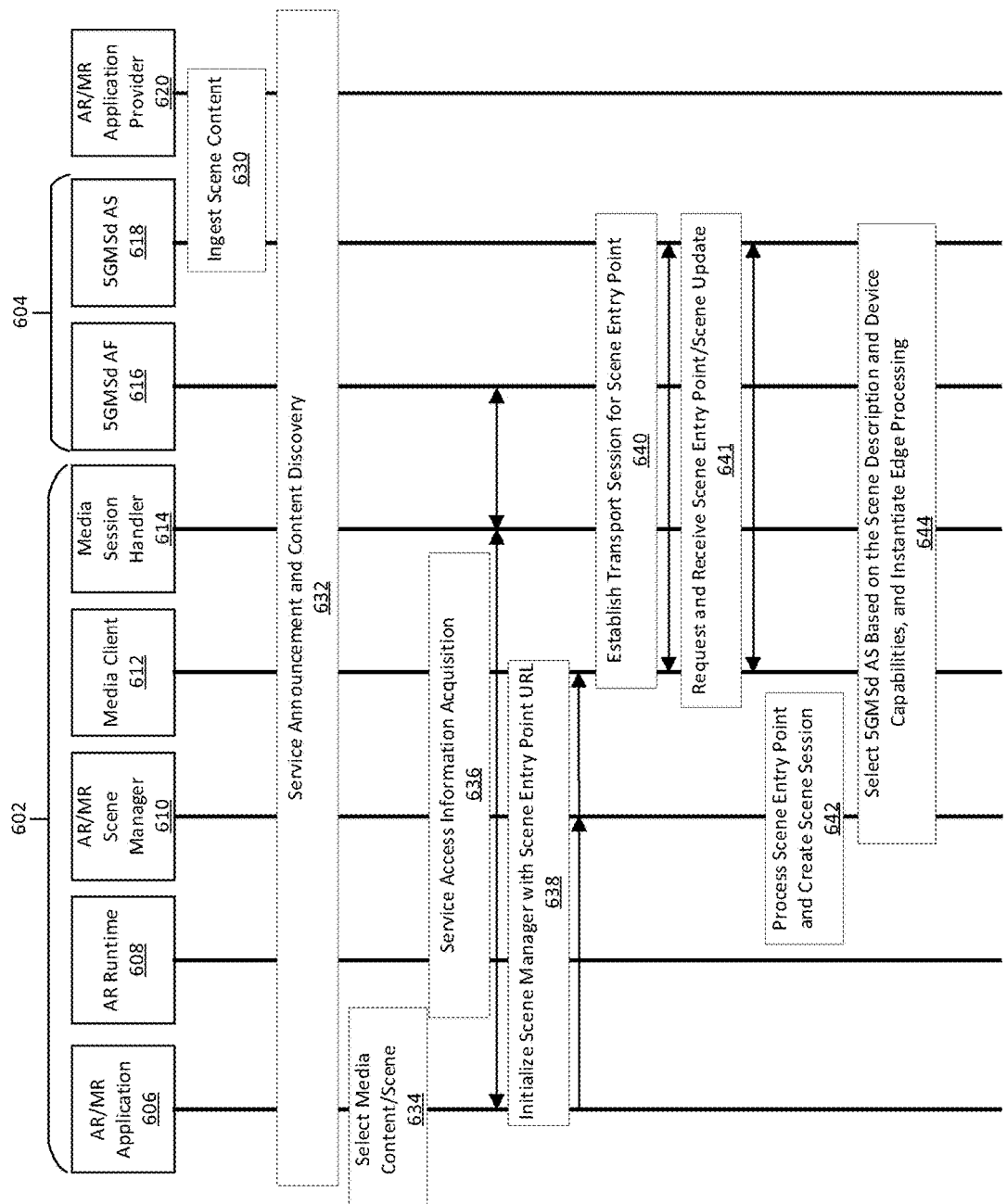
FIGS. 6A, 6B, and 6C are diagrams of an operation flow for EDGAR-based 5G downlink streaming, according to embodiments.
Figure 6B:
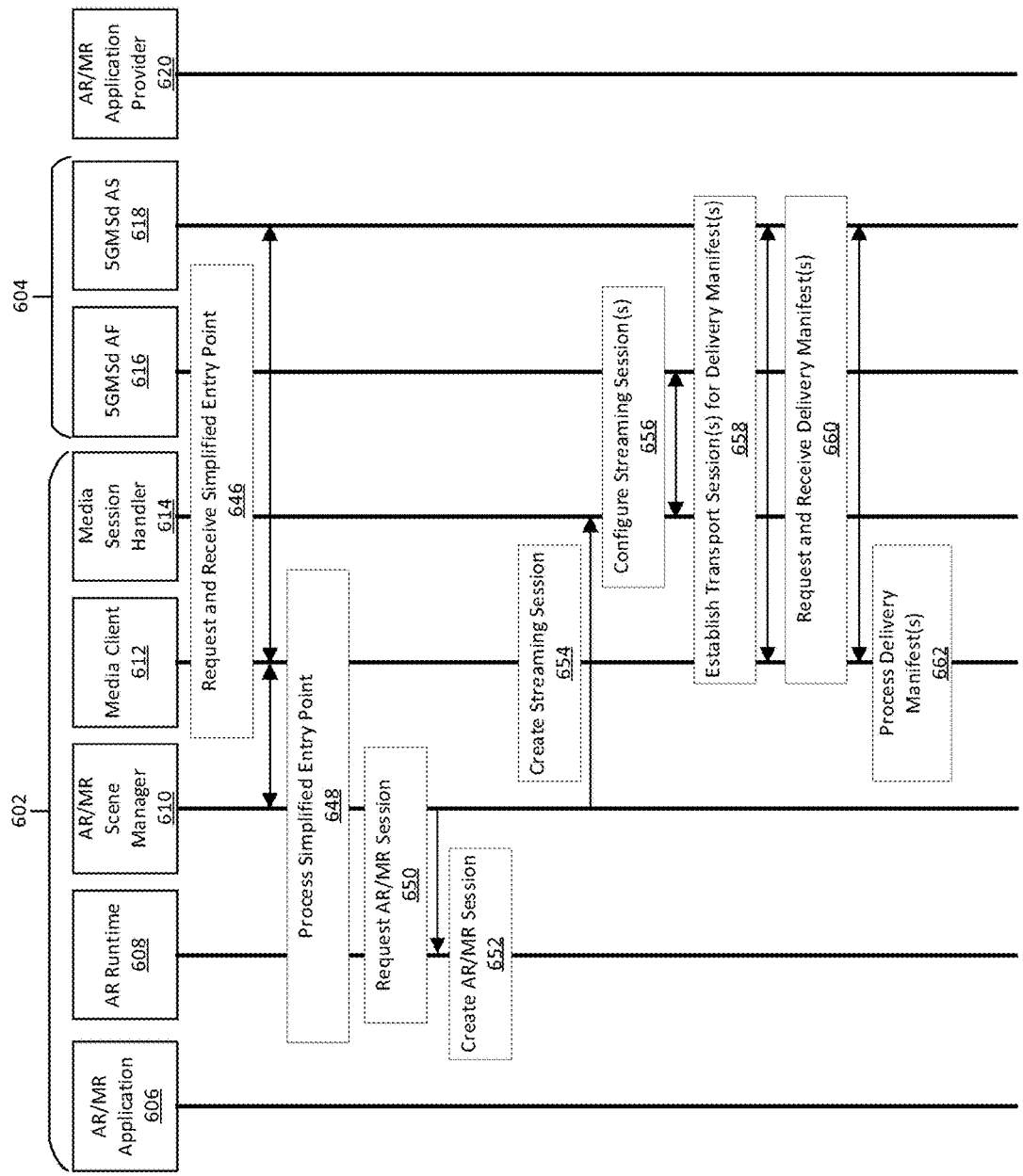
Figure 6C:
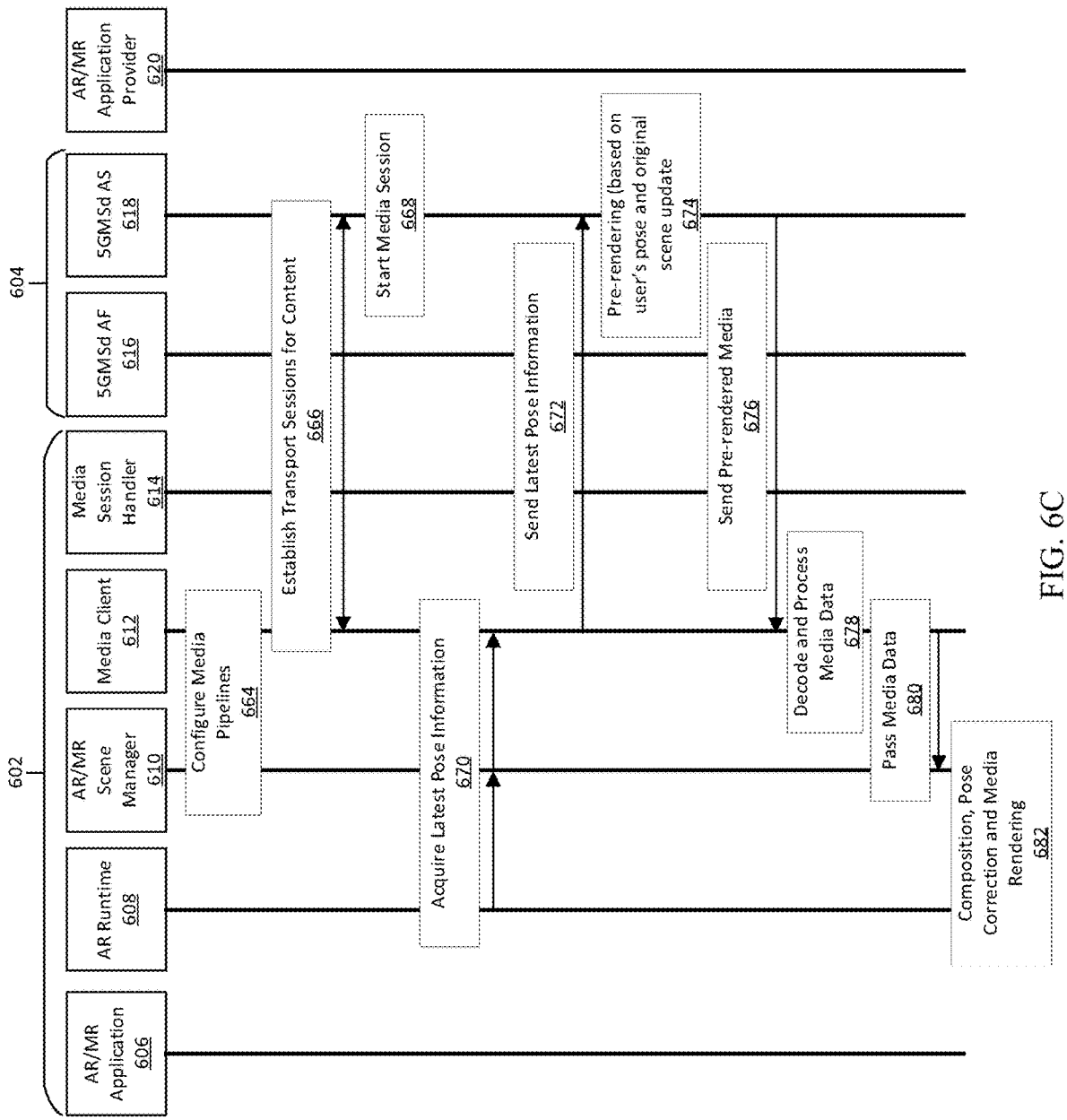

FIGS. 6A, 6B, and 6C are diagrams of an operation flow for EDGAR-based 5G downlink streaming, according to embodiments. The system performing the operation flow of FIG. 6 may include a basic AR/MR application 606, an AR runtime 608, an AR/MR scene manager 610, a media client 612, and a media session handler 614, which may be part of the EDGAR UE 602 (furthermore, the media client 612 and the media session handler 614 may be part of the media access functions). The system also includes a 5GMSd AF 616, a 5GMSd AS 618, which may be part of the cloud/edge server 604. The system may also include an AR/MR application provider 620. The application provider 620 may be referred to as a scene server.

In operation 630, scene content is ingested by the 5GMSd AS 618. In operation 632, a service announcement and content delivery is triggered by the AR/MR application 606. The service access information includes the media client entry or a reference to the service access information is provided through the M8d interface. In operation 634, media content/scenes are selected. In operation 636, the service access information is acquired or updated as needed (i.e., operation 636 may be optional). In operation 638, the AR/MR application 606 initializes the scene manager 610 with the entry point (i.e., the full scene description) URL. In operation 640, the media client 612 establishes the transport session for receiving the entry point. In operation 641, the media client 612 requests and receives the entry point or an update to the scene description. In operation 642, the entry point is processed. As referred to herein, a scene description may be a data table that includes information on a scene, such as entry point, duration, resolution, bitrate, and/or other information related to a scene. A full scene description may include an entry point for the full scene, and a simplified scene description may include an entry point for the simplified scene. The full scene description may refer to an entry point at the beginning of the scene, and the simplified scene description may refer to an entry point for a portion of the full scene (e.g., the portion of the full scene may be the simplified scene). Thus, the simplified scene description may be derived based on the full scene description. For example, the full scene may include time points t0 through t4, and the full scene description may indicate that the entry point of the full scene is time point t0. The simplified scene may include the portion of the full scene from time point t2 to time point t3, and the simplified scene description may indicate that the that the entry point of the simplified scene is time point t2.

In operation 644, the system selects a 5GMSd AS based on the scene description and device capabilities, and instantiates edge processing. Based on the processed scene description and the device capabilities, the 5GMSd AS is selected, and edge processes are instantiated using the processes defined in the edge server 604. The AR/MR scene manager 610 may send the scene description and the device capabilities to the 5GMSd AS 618. The 5GMSd AS 618 derives the edge AS (EAS) key performance indicators (KPIs) and, if needed, selects a new AS/EAS (e.g., through the AF 616) based on the new KPI. The edge processes are started and a new entry point URL is provided to the AR/MR scene manager 610. Alternative, in some embodiments, the AR/MR scene manager 610 may derive the EAS KPIs from the scene description and device capabilities, and request the 5GMSd AF 616 to provide the list of suitable EASs. The AR/MR scene manager 610 may select the AS/EAS and request to start the edge processes in the AS (e.g., the selected AS may be the 5GMSd AS 618). The edge processes are started, and a new entry point URL is provided to the AR/MR scene manager.

In operation 646, the AR/MR scene manager 610 requests the simplified scene entry point/scene description. The edge processes derive the simplified scene entry/description from the full scene description and provide it to the AR/MR scene manager. In operation 648, the simplified entry point (i.e., the simplified scene description) is processed.

In operation 650, the AR/MR scene manager 610 requests the creation of a new AR/MR session from the AR runtime 608. In operation 652, the AR runtime 608 creates the new AR/MR session. In operation 654, a streaming session is created. The media client 612 and/or the AR/MR scene manager 610 may provide the necessary quality of service (QoS) information to the media session handler 614. In operation 656, the streaming session(s) are configured. The media session handler 614 may share the information with the 5GMSd AF 616, including the desired QoS information in some embodiments. Based on existing provisioning by the AR/MR application provider 620, the 5GMSd AF 616 may request QoS modifications to the protocol data unit (PDU) session.

In operation 658, the transport sessions for delivery manifests are established. For the required media content, the media client 612 establishes the transport sessions to acquire delivery manifest information. In operation 660, the media client 612 requests and receives the delivery manifests from the 5GMSd AS 618. In operation 662, the media client 612 processes the delivery manifests. The media client 612, for example, determines the number of needed transport sessions for media acquisition. The media client 612 is configured to use the delivery manifest information to initialize the media pipelines for each media stream. In operation 664, the AR/MR scene manager 610 and the media client 612 configure the rendering and delivery media pipelines.

In operation 666, the media client 612 establishes the transport sessions to acquire the media content. In operation 668, the 5GMSd AS 618 initiates and starts a media session. The media session forms a stateful session loop specific to the UE (i.e., operations 670, 672, 674 and 676).

In operation 670, the latest pose information is acquired by the AR/MR scene manager 610 and is shared with the media client 612. In operation 672, the media client 612 sends the latest pose information to the 5GMSd AS 618. In operation 674, the 5GMSd AS 618 performs pre-rendering of the media base4d on the latest received pose information and possibly any original scene update. Pre-rendering may include decoding and rendering immersive media and encoding the rendered (i.e., two-dimensional) media. In operation 676, the pre-rendered media is sent by the 5GMSd AS 618 to the media client 612. In operation 678, the media client 612 passes decodes and processes the media data. For encrypted media data, the media client 612 may also perform decryption. In operation 680, the media client 612 passes the media data to the AR/MR scene manager 610. In operation 682, the AR/MR scene manager 610 renders the media and passes the rendered media to the AR runtime 608. The AR runtime 608 performs further processing, such as registration of the AR content to the real world, composition, and pose correction.

The AR/MR scene may be dynamically updated during the streaming to the EDGAR device and therefore the scenes can be changed completely during the streaming session. The scene updates for the EDGAR device are part of the same loop as the media object. However, the scene updates occur at the media application server on the edge network. Thus, the client sees any scene update as a continuous part of the video streaming session.

FIG. 7 is a flowchart of a method for EDGAR-based 5G downlink streaming, according to embodiments. In operation 702, the system selects media content including a full scene description. In operation 704, the system selects a 5GMSd AS to stream the media content based on the full scene description. In operation 706, the system derives a simplified scene description based on the full scene description. In operation 708, the system creates an AR/MR session based on the simplified scene description.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for video decoding in a decoder, the method comprising:
   selecting media content including a full scene description;
   requesting a $5^{th}$ generation (5G) media streaming downlink (5GMSd) application server (AS) to stream the media content based on the full scene description;
   deriving a simplified scene description based on the full scene description;
   implementing at least part of an augmented reality (AR)/mixed reality (MR) session based on the simplified scene description, the AR/MR session comprising a double loop call flow of an outer loop, comprising streaming media objects of the simplified scene description of a scene of the full scene description, and an inner loop comprising updating the inner loop, while the media objects are streamed, to stream at least one other media object of the scene of the full scene description besides the objects of the simplified scene description; and
   decoding at least part of the media content based on the double loop call flow.

2. The method of claim 1, wherein selecting the AS to stream the media content comprises deriving at least one key performance indicator (KPI) of a first AS.

3. The method of claim 2, wherein selecting the AS to stream the media content further comprises selecting the first AS to stream the media content based on the at least one KPI.

4. The method of claim 2, further comprising providing a list of suitable edge application servers (EASs) to stream the media content,
   wherein selecting the AS to stream the media content further comprises selecting an EAS from the list of EASs.

5. The method of claim 1, further comprising, after selecting the AS to stream the media content, providing a new entry point uniform resource locator (URL) to an AR/MR scene manager.

6. The method of claim 1, further comprising:
   receiving updated pose information of the media content; and
   pre-rendering the media content based on the updated pose information.

7. The method of claim 6, wherein the receiving the updated pose information and the pre-rendering the media content are performed during a media streaming session in which the media content is streamed.

8. A method for video encoding, the method comprising:
   obtaining media content including a full scene description;
   implementing at least part of an augmented reality (AR)/mixed reality (MR) session based on a simplified scene description of the full scene description, the AR/MR session comprising a double loop call flow of an outer loop, comprising streaming, from a $5^{th}$ generation (5G) media streaming downlink (5GMSd) application server (AS), media objects of the simplified scene description of a scene of the full scene description, and an inner loop comprising updating the inner loop, while the media objects are streamed, to stream at least one other media object of the scene of the full scene description besides the objects of the simplified scene description; and
   encoding at least part of the media content based on the double loop call flow.

9. The method of claim 8, wherein the AS identifies at least one key performance indicator (KPI) of the AS.

10. The method of claim 9, wherein the AS is selected for the AR/MR session based on the at least one KPI.

11. The method of claim 9, further comprising providing a list of suitable edge application servers (EASs) to stream the media content,
    wherein the AS is selected for the AR/MR session as an EAS from the list of EASs.

12. The method of claim 8, further comprising providing a new entry point uniform resource locator (URL) to an AR/MR scene manager.

13. The method of claim 8, further comprising:
    implementing an immersive media delivery comprising providing the at least part of the media content based on pose information of the media content.

14. The method of claim 13, wherein the pose information is received during the AR/MR session.

15. A method of processing visual media data, the method comprising:
    performing a conversion between a visual media file and a bitstream of a visual media data according to a format rule, the format rule indicating to:
    obtain media content including a full scene description; and
    implement at least part of an augmented reality (AR)/mixed reality (MR) session based on a simplified scene description of the full scene description, the AR/MR session comprising a double loop call flow of an outer loop, comprising streaming, from a $5^{th}$ generation (5G) media streaming downlink (5GMSd) application server (AS), media objects of the simplified scene description of a scene of the full scene description, and an inner loop comprising updating the inner loop, while the media objects are streamed, to stream at least one other media object of the scene of the full scene description besides the objects of the simplified scene description.

16. The method of claim 15, wherein the AS identifies at least one key performance indicator (KPI) of the AS.

17. The method of claim 16, wherein the AS is selected for the AR/MR session based on the at least one KPI.

18. The method of claim 16, the format rule further indicating to provide a list of suitable edge application servers (EASs) to stream the media content,
    wherein the AS is selected for the AR/MR session as an EAS from the list of EASs.

19. The method of claim 15, the format rule further indicating to provide a new entry point uniform resource locator (URL) to an AR/MR scene manager.

20. The method of claim 15, the format rule further indicating to implement an immersive media delivery comprising providing the at least part of the media content based on pose information of the media content.

* * * * *